United States Patent
Huang et al.

(10) Patent No.: US 11,686,602 B2
(45) Date of Patent: Jun. 27, 2023

(54) METHOD FOR PROVIDING A HYBRID DISTRIBUTED FIBER OPTIC SENSING SYSTEM WITH IMPROVED CONNECTION TO EXISTING DEPLOYED FIBER INFRASTRUCTURE

(71) Applicant: NEC Laboratories America, Inc., Princeton, NJ (US)

(72) Inventors: Ming-Fang Huang, Princeton, NJ (US); Ting Wang, West Windsor, NJ (US); Tiejun Xia, Richardson, TX (US); Glenn Wellbrock, Richardson, TX (US); Yoshiaki Aono, Tokyo (JP)

(73) Assignees: NEC Corporation, Tokyo (JP); Verizon Patent and Licensing Inc., Basking Ridge, NJ (US)

(*) Notice: Subject to any disclaimer, the term of this patent is extended or adjusted under 35 U.S.C. 154(b) by 146 days.

(21) Appl. No.: 17/196,939

(22) Filed: Mar. 9, 2021

(65) Prior Publication Data
US 2021/0310836 A1    Oct. 7, 2021

Related U.S. Application Data

(60) Provisional application No. 63/004,207, filed on Apr. 2, 2020.

(51) Int. Cl.
*G01H 9/00*        (2006.01)
*G01D 5/353*       (2006.01)
(Continued)

(52) U.S. Cl.
CPC ......... *G01D 5/35338* (2013.01); *G01H 9/004* (2013.01); *G01K 11/32* (2013.01); *H04B 10/25* (2013.01)

(58) Field of Classification Search
None
See application file for complete search history.

(56) References Cited

U.S. PATENT DOCUMENTS

| | | | |
|---|---|---|---|
| 2013/0034351 A1* | 2/2013 | Goldner | H04Q 9/00 398/115 |
| 2018/0202283 A1* | 7/2018 | Jaaskelainen | E21B 43/16 |

* cited by examiner

*Primary Examiner* — Lisa M Caputo
*Assistant Examiner* — Nigel H Plumb
(74) *Attorney, Agent, or Firm* — Joseph Kolodka

(57) ABSTRACT

A method of providing a hybrid distributed fiber optic sensing system (DFOS) that extends an existing fiber optic telecommunications network thereby providing that existing fiber optic telecommunications network with DFOS capabilities. The method provides a length of fiber optic cable, wherein said fiber optic cable conveys communications traffic; provides a DFOS interrogator system in optical communication with the communications fiber optic cable; extends the length of communications fiber optic cable with first and second lengths of fiber optic sensory cable, and operates the DFOS interrogator system such that first sensory data is generated in the first length of fiber optic sensory cable and second sensory data is generated in the second length of fiber optic sensory cable and conveyed to the DFOS interrogator system via the communications fiber optic cable, wherein the first type of sensory data and the second type of sensory data is a type selected from the group consisting of acoustic data, temperature data, and vibration data and the first type of sensory data is not the same type as the second type of sensory data.

4 Claims, 6 Drawing Sheets

(51) Int. Cl.
*G01K 11/32* (2021.01)
*H04B 10/25* (2013.01)

METHOD FOR PROVIDING A HYBRID DISTRIBUTED FIBER OPTIC SENSING SYSTEM WITH IMPROVED CONNECTION TO EXISTING DEPLOYED FIBER INFRASTRUCTURE

CROSS REFERENCE

This disclosure claims the benefit of U.S. Provisional Patent Application Ser. No. 63/004,207 filed 2 Apr. 2020 the entire contents of which is incorporated by reference as if set forth at length herein.

TECHNICAL FIELD

This disclosure relates generally to distributed fiber optic sensing (DFOS) systems, method, and structures. More particularly, it describes the extension of existing optical fiber infrastructure into hybrid distributed fiber optic sensing systems that may advantageously provide sensing capabilities where none previously existed.

BACKGROUND

Distributed fiber optic sensing systems have shown great utility in a number of unique sensing applications due to their intrinsic advantages over conventional techniques. They can be integrated into normally inaccessible areas and can function in harsh environments. They are immune to radio frequency interference and electromagnetic interference and can provide continuous, real-time measurements along an entire length of a fiber optic cable.

Despite such utility, extending existing fiber optic systems—both sensing and non-sensing—into further geographic areas that are not already sensor monitored—poses formidable problems.

SUMMARY

An advance in the art is made according to aspects of the present disclosure directed to distributed fiber optic sensing systems (DFOS), methods, and structures that are advantageously extended into a hybrid distributed fiber sensing system wherein both existing deployed fiber optic cable and newly added fiber extension(s) work together to provide optical sensing functionality.

According to certain aspects of the present disclosure, an existing, deployed fiber infrastructure may advantageously be used as a sensing backhaul for newly added fiber optic sensing structures. Advantageously, by employing existing connection/splicing points in existing fiber optic infrastructure—i.e., manholes/hand holes and junction boxes installed on telephone poles to connect a fiber extension, a hybrid fiber optic sensing system and application according to aspects of the present disclosure can reach—and sense—locations that the original (existing) fiber infrastructure is not able to reach. Hence, every joined point can be a sensing backbone by extending/adding dedicated fiber cables to sense different elements.

Viewed from a certain aspect, methods according to aspects of the present disclosure provide a method of providing a hybrid, distributed fiber optic sensing (DOFS) system comprising, providing a length of fiber optic cable, wherein said fiber optic cable conveys communications traffic; providing a DFOS interrogator system in optical communication with the communications fiber optic cable; extending the length of communications fiber optic cable with a length of fiber optic sensory cable, said length of fiber optic sensory cable in optical communication with the length of communications fiber optic cable; and operating the DFOS interrogator system such that sensory data is generated in the length of fiber optic sensory cable and conveyed to the DFOS interrogator system via the communications fiber optic cable.

BRIEF DESCRIPTION OF THE DRAWING

A more complete understanding of the present disclosure may be realized by reference to the accompanying drawing in which.

DESCRIPTION

Figure 1:
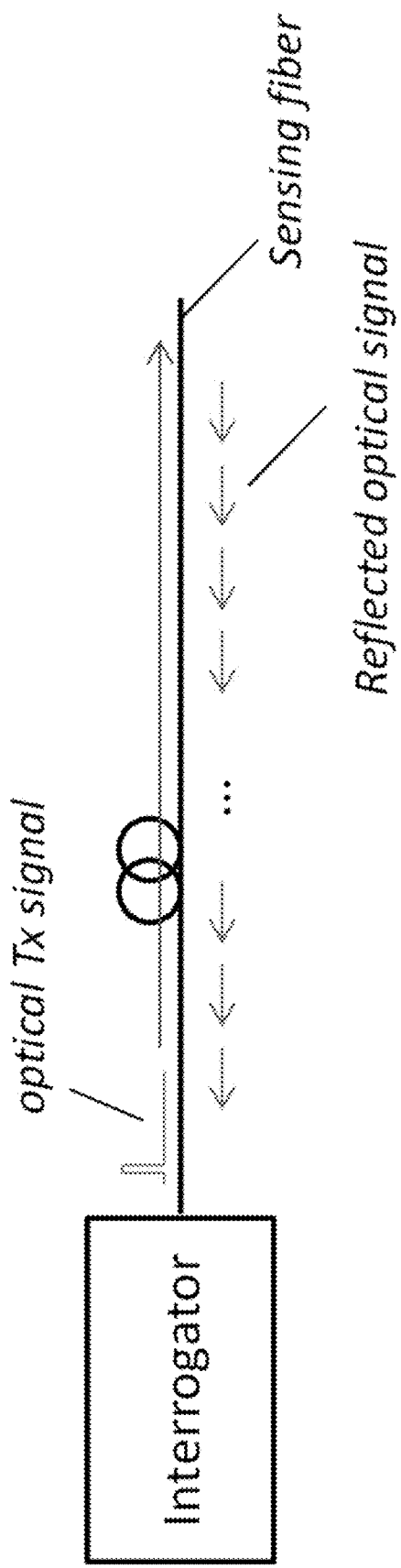
FIG. 1 is a schematic diagram showing an illustrative prior art distributed fiber optic sensing arrangement including interrogator and fiber optic cable according to aspects of the present disclosure.

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are intended to be only for pedagogical purposes to aid the reader in understanding the principles of the disclosure and the concepts contributed by the inventor(s) to furthering the art and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure.

Unless otherwise explicitly specified herein, the FIGs comprising the drawing are not drawn to scale.

By way of some additional background, we begin by noting that distributed fiber optic sensing (DFOS) is an important and widely used technology to detect environmental conditions (such as temperature, vibration, stretch level etc.) anywhere along an optical fiber cable that in turn is connected to an interrogator. As is known, contemporary interrogators are systems that generate an input signal to the fiber and detects/analyzes the reflected/scattered and subsequently received signal(s). The signals are analyzed, and an output is generated which is indicative of the environmental conditions encountered along the length of the fiber. The signal(s) so received may result from reflections in the fiber, such as Raman backscattering, Rayleigh backscattering, and Brillion backscattering. It can also be a signal of forward direction that uses the speed difference of multiple modes. Without losing generality, the following description assumes reflected signal though the same approaches can be applied to forwarded signal as well.

As will be appreciated, a contemporary DFOS system includes an interrogator that periodically generates optical pulses (or any coded signal) and injects them into an optical fiber. The injected optical pulse signal is conveyed along the optical fiber.

At locations along the length of the fiber, a small portion of signal is reflected and conveyed back to the interrogator. The reflected signal carries information the interrogator uses to detect, such as a power level change that indicates—for example—a mechanical vibration.

The reflected signal is converted to electrical domain and processed inside the interrogator. Based on the pulse injection time and the time signal is detected, the interrogator determines at which location along the fiber the signal is coming from, thus able to sense the activity of each location along the fiber.

As we shall show and describe—systems, methods, and structures according to aspects of the present disclosure employs a DVS (Distributed Vibration Sensor) or DAS (Distributed Acoustic Sensor) interrogator to recover a vibration occurring anywhere along a sensing fiber in equivalent sampling frequency of the pulse repetition rate. For example, for a DVS or DAS that uses pulses of 20 kHz repetition rate, the vibration at the point of interest will be sampled at 20 kHz frequency which—as those skilled in the art will understand and appreciate—is able to cover frequency of up to 10 kHz according to Nyquist rule.

FIG. 1 is a schematic diagram showing an illustrative, prior-art, interrogator, and distributed fiber optic sensing system (DFOS). As may be observed from that figure, such system may comprise a DVS or DAS, which includes an interrogator and its attached sensing fiber. As previously noted, the interrogator periodically provides/injects optical pulses to the fiber. A small portion of the applied pulse(s) is reflected at each location along the fiber while such pulse(s) traverse the length of the fiber. The reflected signal(s) convey information (e.g., vibration to the fiber) to the interrogator. The interrogator continuously samples the backscattered signal, runs pre-processing (such as filtering, normalization) and eventually does per-location processing. For a location i, such a location is associated signals of time $t_i+n*T$, where $t_i$ is the time that the interrogator receives location i's reflection; T is pulse repetition cycle length, and n=0, 1, 2, . . . . Advantageously, the periodic pulse(s) can also comprise a code sequence to increase the system sensitivity and resolution.

Figure 2A:
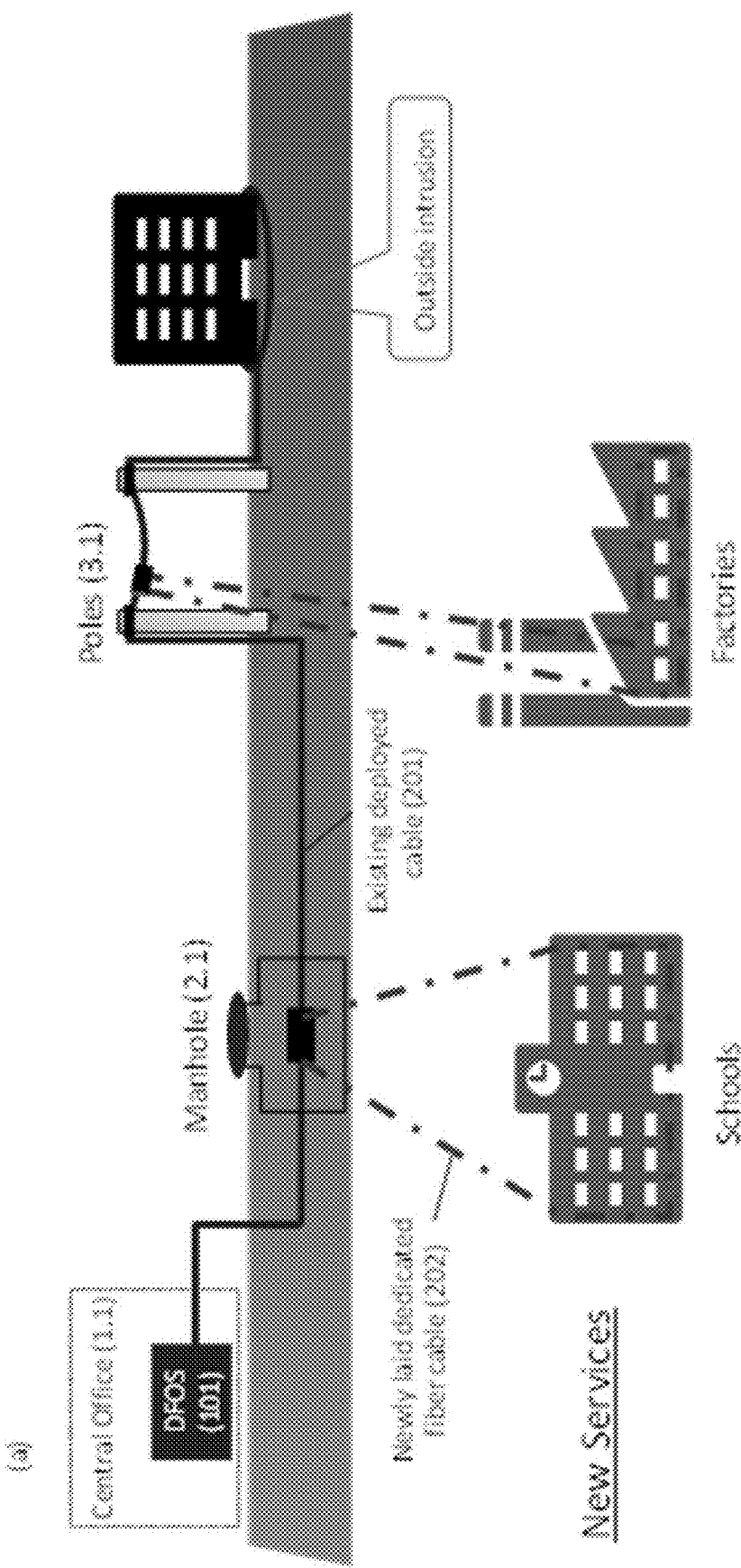
FIG. 2(A) is a schematic diagram showing an illustrative hybrid sensing system including existing deployed optical cable with a newly laid dedicated fiber cable providing new services as part of an overall distributed fiber optic sensing system (DFOS)
Figure 2B:
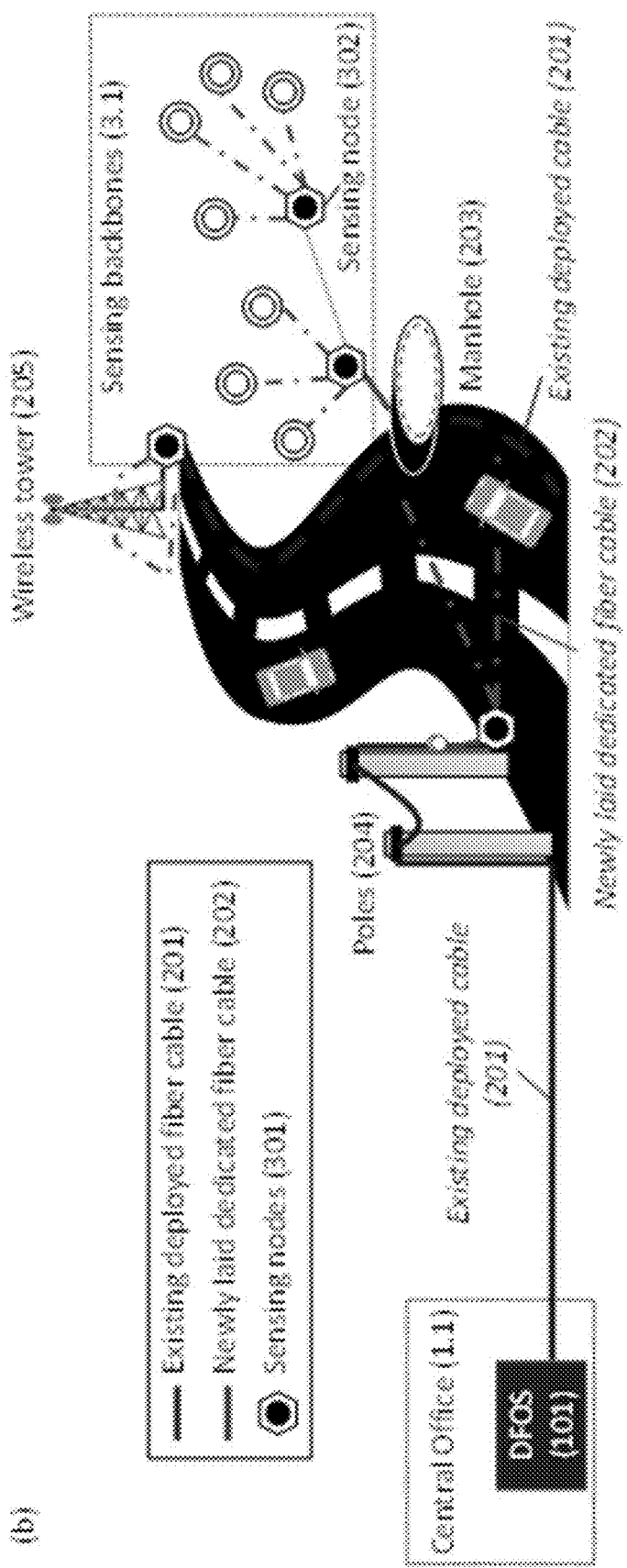
FIG. 2(B) is a schematic diagram showing an additional illustrative, hybrid fiber optic sensing system according to aspects of the present disclosure.

A schematic diagram of an illustrative sensing backbones according to aspects of the present disclosure is shown in FIG. 2(A) and FIG. 2(B). By extending existing fiber infrastructure(s) from manholes and poles to other facilities such as schools and factories, new services can be provided which in turn will create additional value to a carrier's existing infrastructures.

With continued reference to the figures, we note that to realize remote monitoring, a distributed fiber optic sensing (DFOS) system 101 is shown positioned in a central office and is optically/mechanically connected to an existing deployed fiber optic cable 201. As will be appreciated by those skilled in the art, the fiber optic cable may be either buried underground or suspended overhead, i.e., on poles.

Figure 2C:
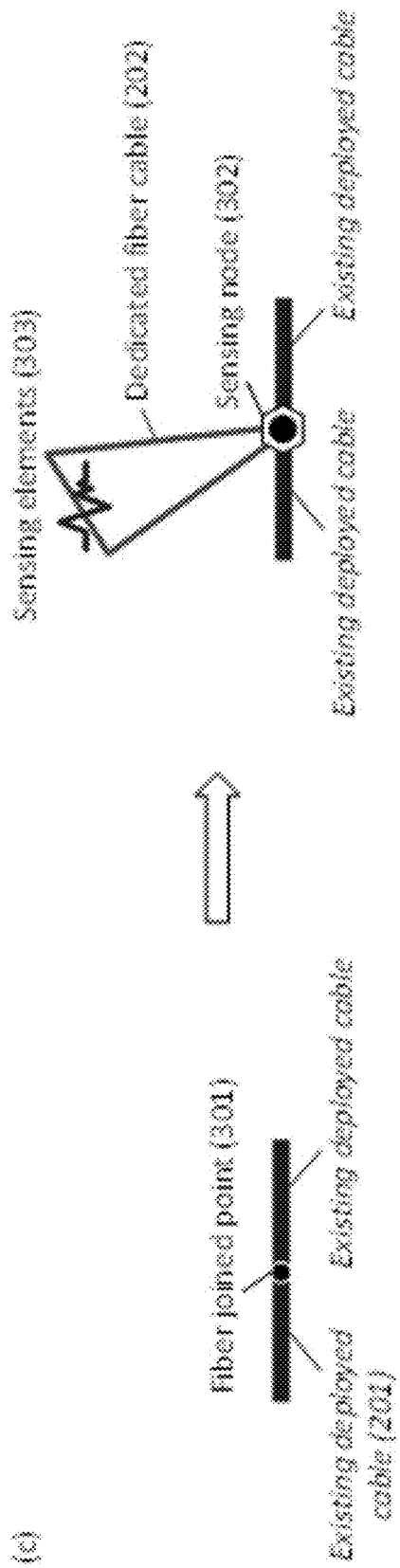
FIG. 2(C) is a schematic diagram showing an illustrative extension of an existing deployed optical cable into a hybrid sensing system according to aspects of the present disclosure.

FIG. 2(C) shows a scenario in which an illustrative fiber joined point (e.g. connection points, splicing points) 301 acts as a sensing node 302 thereby effecting a hybrid, distributed fiber optic sensing network according to aspects of the present disclosure. As may be observed, newly laid dedicated fiber cables 202 are optically connected to and extended from a joined point 301 such that sensing elements 303 may be interrogated via DFOS mechanisms. As will be readily understood and appreciated by those skilled in the art, every joined point in an existing optical network may become a sensing node and subsequently cascaded into sensing backbones 3.1.

Figure 2D:
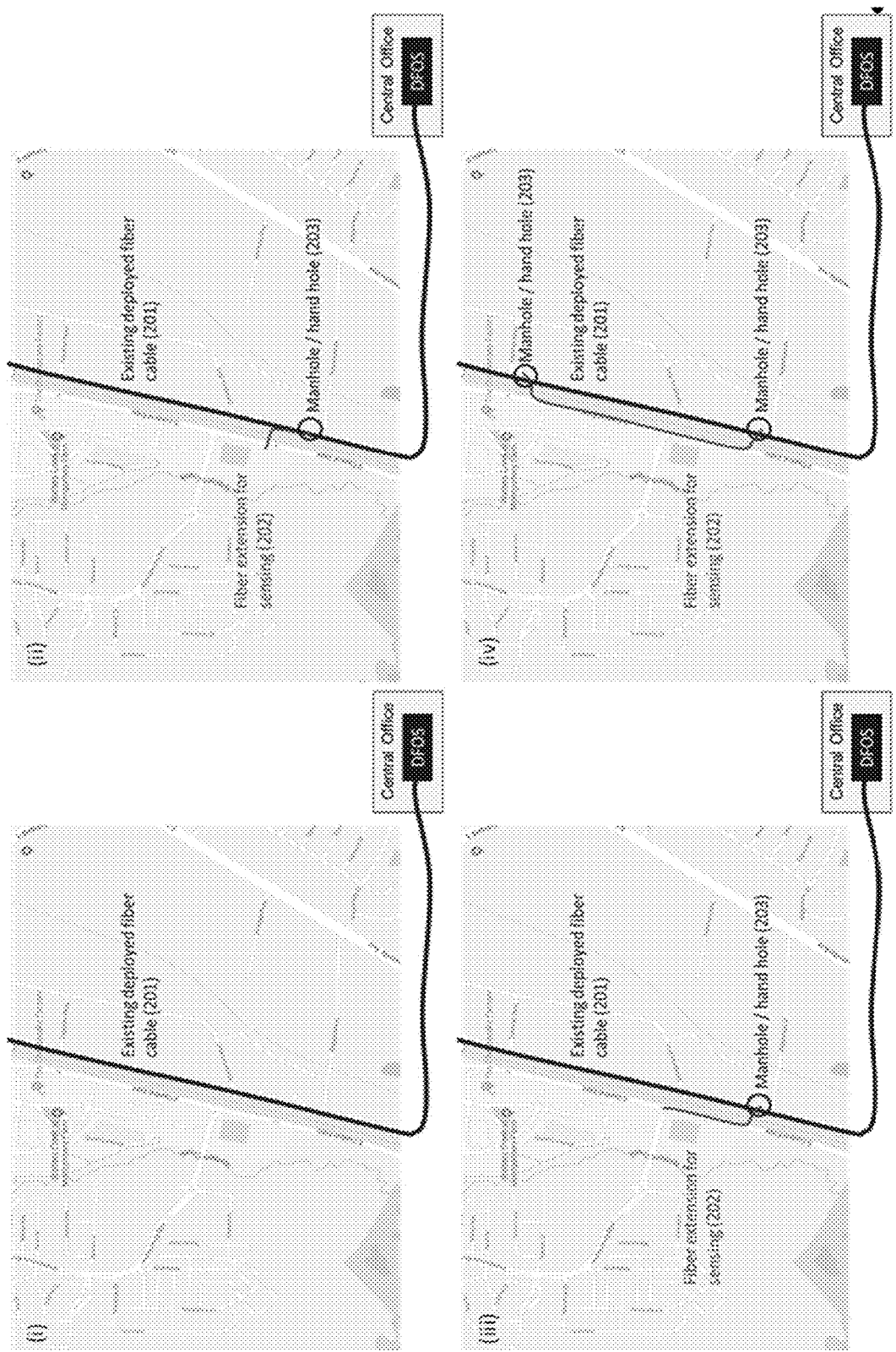
FIG. 2(D) is a schematic diagram of an illustrative extension of an existing deployed cable into a hybrid sensing system according to aspects of the present disclosure.

Turning now to FIG. 2(D), there it shows an illustrative example of hybrid distributed sensing backbones from deployed field fiber. As will be appreciated—without extension cables—sensing applications can be applied on existing deployed fiber optic cable 201, as inserted in (i). Inserted (ii)-(iv) shows the hybrid cable cascaded from manhole/hand hole 203 and back to original deployed fiber through another manhole/hand hole. Hence, the entire route of extension fiber 202 can also be sensed by the DFOS system, regardless of where the extension fiber is deployed (e.g. school, factory, parking lot, etc.). We note that for the illustrative architecture depicted in the figure according to aspects of the present disclosure, it is relatively easy to integrate with a telecommunication carrier's existing fiber optic infrastructure.

Figure 3:
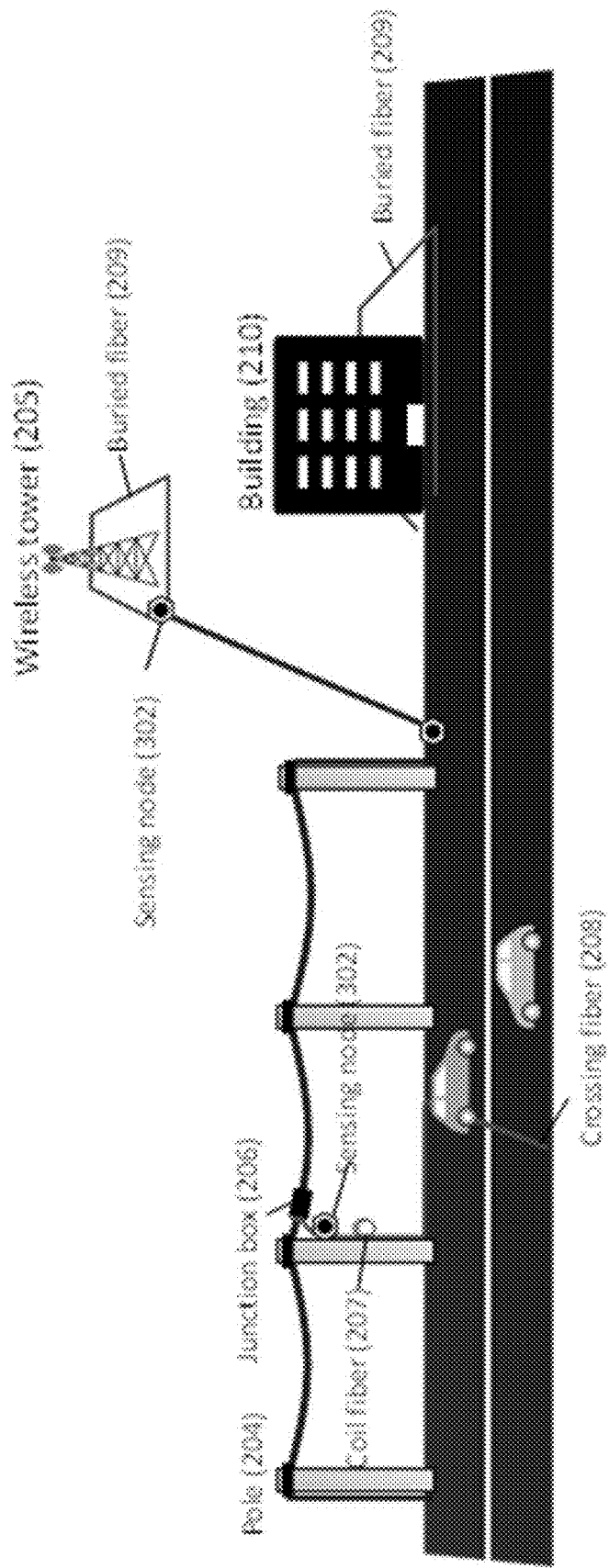
FIG. 3 is a schematic diagram of an illustrative sensing backbone according to aspects of the present disclosure.

As may be appreciated by those skilled in the art, there are many applications that may utilize a sensing backbone such as ones constructed according to aspects of the present disclosure. FIG. 3 shows an illustrative example of a junction box 206 that is located with aerial cables being utilized as a sensing node 302. Those skilled in the art will appreciate that such utilization according to the present disclosure is not limited to aerial cables—but can also extend from manholes and/or hand holes.

As shown in that figure, coil optical fiber is suspended on poles 207. One application of such aerial cable deployment is acoustic detection which can advantageously sense acoustic signals in a surrounding environment. To enhance acoustic signal pickup, coil fiber 207 on poles advantageously provides a ready solution. More particularly, such coiled fiber, aerial deployment increases detection length and also provides ready proximity to detectable activities such as city noise, car crashes, etc.

Also shown in the figures is a crossing fiber 208 which may advantageously provide sensory information about vehicle traffic or other disturbances related to a roadway that fiber optic cable positioned parallel to the roadway cannot. As will be readily appreciated, a hybrid fiber optic sensory network according to aspects of the present disclosure may advantageously provide such crossing fiber(s) that provides a more accurate sensing of multi-lane vehicular traffic on a roadway.

Finally, shown further in the figure, buried cable 209 provides for a safer facility application. As will be understood by those skilled in the art, future 5G cellular towers

205, will include one or more optical fiber(s) connected directly to individual cell towers. Advantageously—and according to aspects of the present disclosure—it is possible to extend fiber cable from a junction box to area(s) surrounding the cell tower(s) for facility safety detection. Irregular construction (i.e., digging) and/or person intruders may be sensed/discovered before damage is done to a tower or fiber facility. Extending on this concept, since FTTx (fiber-to-the-x—i.e., home, business, etc) services are generally available and more is being deployed constantly, extending such FTTx fiber cable to areas surrounding a building/home/etc may advantageously be combined with vibration sensing operation thereby providing intrusion detection and/or facility monitoring can be realized.

At this point, while we have presented this disclosure using some specific examples, those skilled in the art will recognize that our teachings are not so limited. Accordingly, this disclosure should only be limited by the scope of the claims attached hereto.

The invention claimed is:

1. A method of providing a hybrid, distributed fiber optic sensing (DFOS) system with improved connection to existing deployed fiber infrastructure, said method comprising:
    providing a length of fiber optic cable, wherein said fiber optic cable conveys communications traffic as part of an existing deployed fiber infrastructure;
    providing a DFOS interrogator system in optical communication with the communications fiber optic cable;
    extending the length of communications fiber optic cable with a first length of fiber optic sensory cable, said first length of fiber optic sensory cable in optical communication with the length of communications fiber optic cable;
    extending the length of communications fiber optic cable with a second length of fiber optic sensory cable, said second length of fiber optic sensory cable in optical communication with the length of communications fiber optic cable; and
    operating the DFOS interrogator system such that a first type of sensory data is generated in the first length of fiber optic sensory cable and conveyed to the DFOS interrogator system via the communications fiber optic cable and a second type of sensory data is generated in the second length of fiber optic sensory cable and conveyed to the DFOS interrogator system via the communications fiber optic cable;
    wherein the first type of sensory data and the second type of sensory data is a type selected from the group consisting of acoustic data, temperature data, and vibration data; and
    wherein the first type of sensory data is not the same type as the second type of sensory data.

2. The method of claim 1 wherein communications fiber optic cable and the first length of fiber optic sensory cable are joined in optical communication at a junction box.

3. The method of claim 2 wherein the junction box is located in a manhole.

4. The method of claim 2 wherein the junction box is located on an aerial cable or pole.

* * * * *